(12) United States Patent
Leonard et al.

(10) Patent No.: US 10,822,735 B2
(45) Date of Patent: Nov. 3, 2020

(54) SPIN INEFFICIENCY DETECTION FOR A WASHING MACHINE APPLIANCE

(71) Applicant: Haier US Appliance Solutions, Inc., Wilmington, DE (US)

(72) Inventors: Ryan Ellis Leonard, Louisville, KY (US); Stephen Edward Hettinger, Louisville, KY (US); Ryan James Scheckelhoff, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 166 days.

(21) Appl. No.: 15/898,268

(22) Filed: Feb. 16, 2018

(65) Prior Publication Data

US 2019/0257018 A1    Aug. 22, 2019

(51) Int. Cl.
*D06F 33/00* (2020.01)
*D06F 37/30* (2020.01)
*D06F 34/18* (2020.01)

(52) U.S. Cl.
CPC .............. *D06F 33/00* (2013.01); *D06F 34/18* (2020.02); *D06F 37/304* (2013.01); *D06F 2202/065* (2013.01); *D06F 2204/065* (2013.01)

(58) Field of Classification Search
CPC ...................................................... D06F 33/00
See application file for complete search history.

(56) References Cited

U.S. PATENT DOCUMENTS

| | | | |
|---|---|---|---|
| 4,054,412 A | 10/1977 | Brummett et al. | |
| 4,411,664 A | 10/1983 | Rickard et al. | |
| 6,269,666 B1 | 8/2001 | Whah et al. | |
| 7,765,837 B2 | 8/2010 | Hoppe et al. | |
| 2008/0178398 A1 | 7/2008 | Darby et al. | |
| 2011/0185513 A1* | 8/2011 | Suel, II | D06L 1/20 8/137 |
| 2011/0247146 A1* | 10/2011 | Miller | D06F 35/007 8/137 |
| 2017/0145616 A1 | 5/2017 | Janke et al. | |

* cited by examiner

*Primary Examiner* — Jason Y Ko
(74) *Attorney, Agent, or Firm* — Dority & Manning, P.A.

(57) ABSTRACT

A washing machine appliance includes a motor for selectively rotating a wash basket within a wash tub. A controller is configured for initiating a spin cycle by ramping up the speed of the wash basket to a target speed. The controller monitors a measured basket speed to determine whether the measured basket speed has reached a predetermined acceleration reference speed within an acceleration time limit or whether the measured basket speed has fallen below a dropout reference speed for a dropout time limit. If either condition exists, the controller adjusts the operation of the washing machine appliance, e.g., by reducing the wash basket speed to permit wash fluid entrained in the annulus to escape and reduce drag on the wash basket.

20 Claims, 6 Drawing Sheets

SPIN INEFFICIENCY DETECTION FOR A WASHING MACHINE APPLIANCE

FIELD OF THE INVENTION

The present subject matter relates generally to washing machine appliances, and more particularly to methods for correcting spin inefficiencies in washing machine appliances.

BACKGROUND OF THE INVENTION

Washing machine appliances generally include a wash tub for containing water or wash fluid, e.g., water and detergent, bleach, and/or other wash additives. A wash basket is rotatably mounted within the wash tub and defines a wash chamber for receipt of articles for washing, and an agitation element is rotatably mounted within the wash basket. Washing machine appliances are typically equipped to operate in one or more modes or cycles, such as wash, rinse, and spin cycles. For example, during a wash or rinse cycle, the wash fluid is directed into the wash tub in order to wash and/or rinse articles within the wash chamber. In addition, the wash basket and/or the agitation element can rotate at various speeds to agitate or impart motion to articles within the wash chamber, to wring wash fluid from articles within the wash chamber, etc.

In order to increase the wash capacity of washing machine appliances, conventional washing machine appliances have very large wash baskets and the space between the wash tub and the wash basket, i.e., the annulus, is very small. In addition, in order to meet stringent energy regulations while maintaining wash performance and reducing cycle times, the wash basket spin speeds have also been increased. Notably, smaller annulus gaps and higher spin speeds increase the likelihood of water entrainment during the spin cycle, especially during out of balance conditions or with laundry articles which shed a large amount of water (e.g., terry cloth towels). Water entrainment is a phenomenon that is induced when the water extracted from the laundry load during a spin cycle is ejected from the wash basket into the wash tub, but rather than travelling down the annulus into the sump to be drained, the water continues to rotate within the annulus due to coupling with the rotating basket. This water entrainment causes excessive drag on the wash basket which in turn can lead to reduced spin speeds, excessive motor heating, increased noise, and wearing of components.

Accordingly, a washing machine appliance including features for improved water drainage and improved spin cycles would be desirable. In particular, a washing machine appliance and associated control methods for reducing water entrainment and drag on the wash basket would be particularly beneficial.

BRIEF DESCRIPTION OF THE INVENTION

The present subject matter provides a washing machine appliance including a motor for selectively rotating a wash basket within a wash tub. A controller is configured for initiating a spin cycle by ramping up the speed of the wash basket to a target speed. The controller monitors a measured basket speed to determine whether the measured basket speed has reached a predetermined acceleration reference speed within an acceleration time limit or whether the measured basket speed has fallen below a dropout reference speed for a dropout time limit. If either condition exists, the controller adjusts the operation of the washing machine appliance, e.g., by reducing the wash basket speed to permit wash fluid entrained in the annulus to escape and reduce drag on the wash basket. Additional aspects and advantages of the invention will be set forth in part in the following description, or may be apparent from the description, or may be learned through practice of the invention.

In one exemplary embodiment, a washing machine appliance is provided including a cabinet, a wash tub positioned within the cabinet and defining a wash chamber for receipt of articles for washing, and a wash basket rotatably mounted within the wash tub. A motor is operably coupled to the wash basket for selectively rotating the wash basket and a controller is operably coupled to the motor. The controller is configured for initiating a spin cycle, obtaining a measured basket speed, and determining that the measured basket speed has not reached an acceleration reference speed within an acceleration time limit. In addition, the controller adjusts the operation of the washing machine appliance in response to determining that the measured basket speed has not reached the acceleration reference speed within the acceleration time limit.

In another exemplary embodiment, a method for operating a washing machine appliance is provided. The washing machine includes a wash basket rotatably mounted within a wash tub and a motor for selectively rotating the wash basket. The method includes initiating a spin cycle, obtaining a measured basket speed of the wash basket, and determining that the measured basket speed has not reached an acceleration reference speed within an acceleration time limit. The method further includes adjusting the operation of the washing machine appliance in response to determining that the measured basket speed has not reached the acceleration reference speed within the acceleration time limit.

According to still another exemplary embodiment, a washing machine appliance is provided including a cabinet, a wash tub positioned within the cabinet and defining a wash chamber for receipt of articles for washing, and a wash basket rotatably mounted within the wash tub. A motor is operably coupled to the wash basket for selectively rotating the wash basket and a controller is operably coupled to the motor. The controller is configured for initiating a spin cycle, obtaining a measured basket speed, and determining that the measured basket speed has not crossed a predetermined basket speed within a predetermined time limit. The controller adjusts the operation of the washing machine appliance in response to determining that the measured basket speed has not crossed the predetermined basket speed within the predetermined time limit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
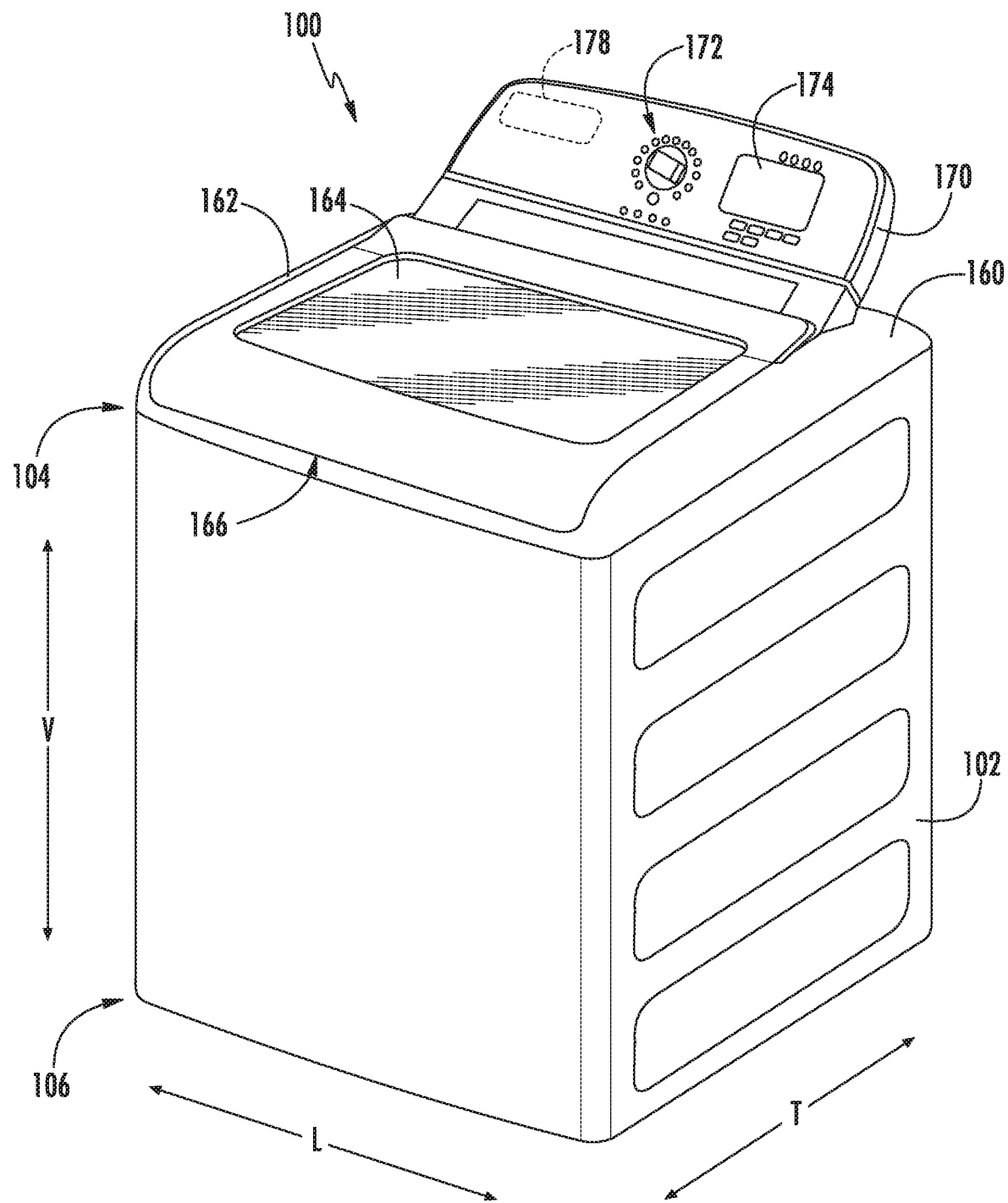
FIG. 1 provides a perspective view of a washing machine appliance according to an exemplary embodiment of the present subject matter with a door of the exemplary washing machine appliance shown in a closed position.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
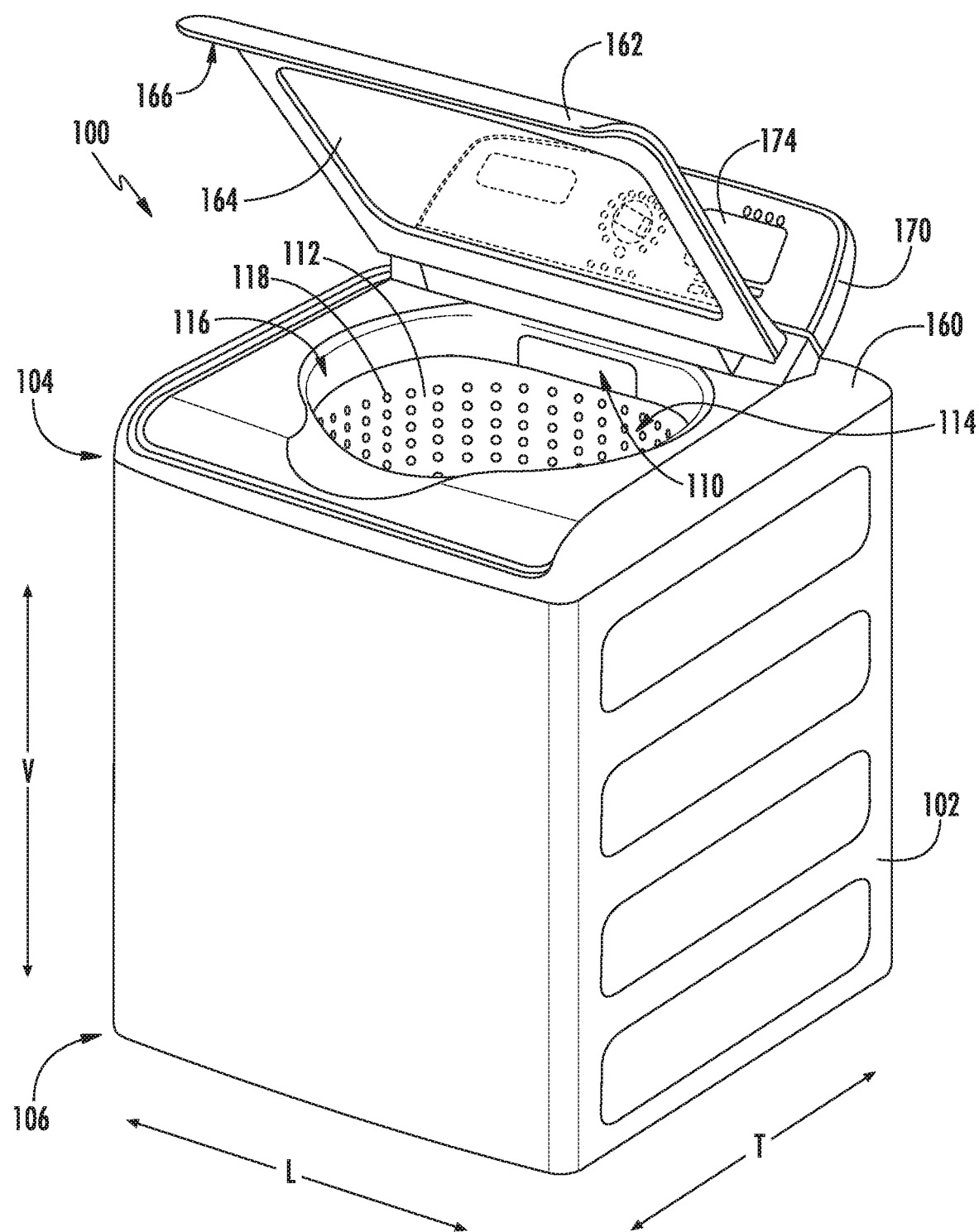
FIG. 2 provides a perspective view of the exemplary washing machine appliance of FIG. 1 with the door of the exemplary washing machine appliance shown in an open position.
Figure 3:
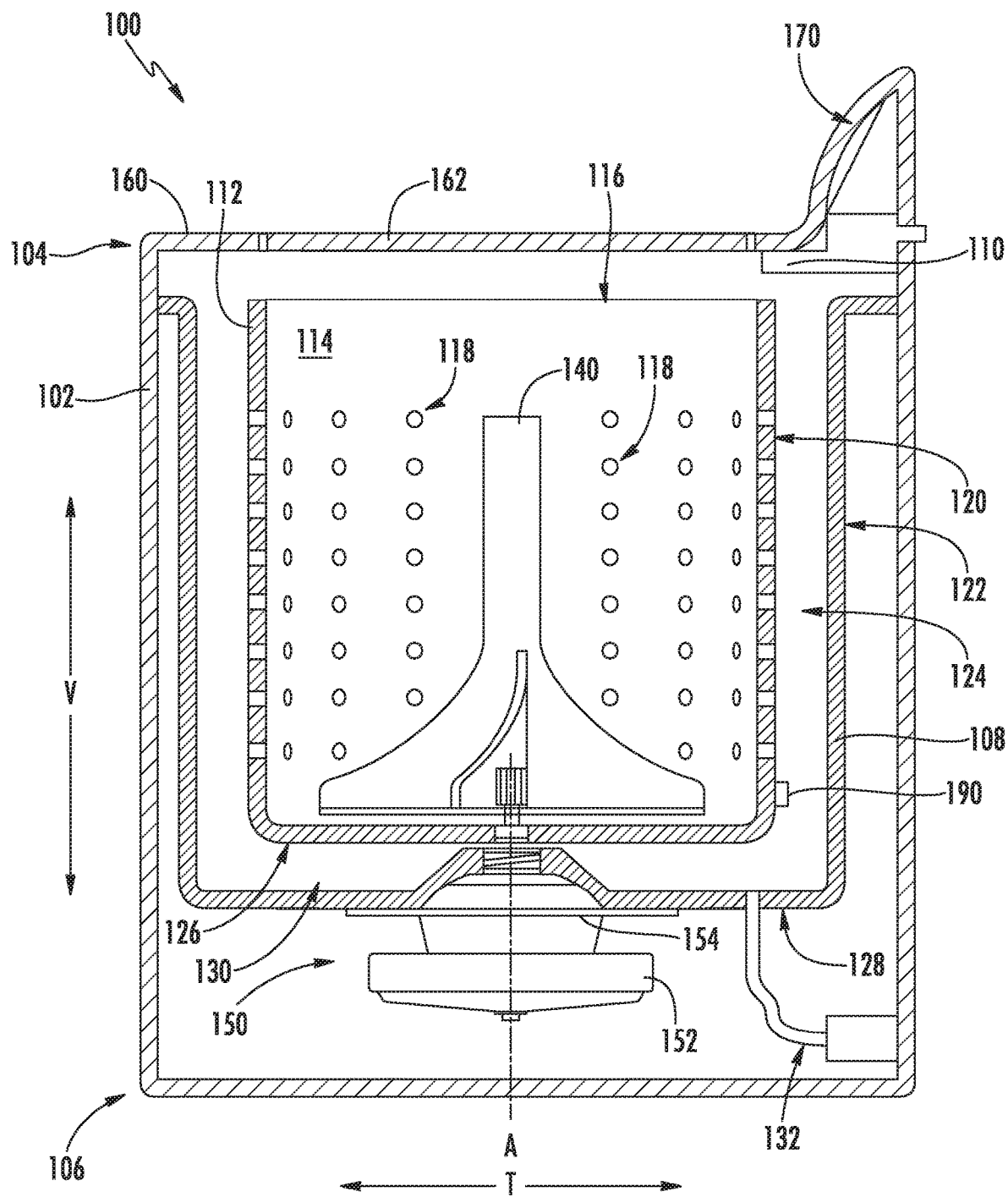
FIG. 3 provides a side, cross sectional view of the exemplary washing machine appliance of FIG. 1 according to an exemplary embodiment of the present subject matter.

FIGS. 1 through 3 illustrate an exemplary embodiment of a vertical axis washing machine appliance 100. Specifically, FIGS. 1 and 2 illustrate perspective views of washing machine appliance 100 in a closed and an open position, respectively. FIG. 3 provides a side cross-sectional view of washing machine appliance 100. Washing machine appliance 100 generally defines a vertical direction V, a lateral direction L, and a transverse direction T, each of which is mutually perpendicular, such that an orthogonal coordinate system is generally defined.

While described in the context of a specific embodiment of vertical axis washing machine appliance 100, it should be appreciated that vertical axis washing machine appliance 100 is provided by way of example only. It will be understood that aspects of the present subject matter may be used in any other suitable washing machine appliance, such as a horizontal axis washing machine appliance. Indeed, modifications and variations may be made to washing machine appliance 100, including different configurations, different appearances, and/or different features while remaining within the scope of the present subject matter.

Washing machine appliance 100 has a cabinet 102 that extends between a top portion 104 and a bottom portion 106 along the vertical direction V. As best shown in FIG. 3, a wash tub 108 is positioned within cabinet 102 for holding wash and rinse fluids for agitation. Washing machine appliance 100 further includes a primary dispenser 110 (FIG. 2) for dispensing wash fluid into wash tub 108. The term "wash fluid" refers to a liquid used for washing and/or rinsing articles during an operating cycle and may include any combination of water, detergent, fabric softener, bleach, and other wash additives or treatments. In addition, washing machine appliance 100 includes a wash basket 112 that is movably disposed and rotatably mounted in wash tub 108. Wash basket 112 generally defines a wash chamber 114 including an opening 116 for receipt of articles for washing. Wash basket 112 further defines a plurality of perforations 118 to facilitate fluid communication between an interior of wash basket 112 and wash tub 108.

More specifically, wash basket 112 is spaced apart from wash tub 108 to define a space for wash fluid to escape wash chamber 114. In this regard, a cylindrical basket sidewall 120 is spaced apart from a tub sidewall 122 to define an annulus 124 therebetween. Similarly, a basket bottom 126 is spaced apart from a tub bottom 128 to define a sump 130 therebetween. During a spin cycle, wash fluid within articles of clothing and within wash chamber 114 is urged through perforations 118 into annulus 124. The wash fluid then travels down annulus 124 and collects in sump 130. Washing machine appliance 100 further includes a pump assembly 132 (FIG. 3) that is located beneath wash tub 108 and wash basket 112 for gravity assisted flow when draining wash tub 108.

An impeller or agitation element 140 (FIG. 3), such as a vane agitator, impeller, auger, oscillatory basket mechanism, or some combination thereof is disposed in wash basket 112 to impart an oscillatory motion to articles and liquid in wash basket 112. More specifically, agitation element 140 extends into wash basket and assists agitation of articles disposed within wash basket 112 during operation of washing machine appliance 100, e.g., to facilitate improved cleaning. In different embodiments, agitation element 140 includes a single action element (i.e., oscillatory only), a double action element (oscillatory movement at one end, single direction rotation at the other end) or a triple action element (oscillatory movement plus single direction rotation at one end, single direction rotation at the other end). As illustrated in FIG. 3, agitation element 140 and wash basket 112 are oriented to rotate about a drive axis A (which is substantially parallel to vertical direction V).

Referring still to FIG. 3, washing machine appliance 100 includes a motor assembly 150 in mechanical communication with wash basket 112 to selectively rotate wash basket 112 (e.g., during an agitation or a rinse cycle of washing machine appliance 100). In addition, motor assembly 150 may also be in mechanical communication with agitation element 140. In this manner, motor assembly 150 may be configured for selectively rotating or oscillating wash basket 112 and/or agitation element 140 during various operating cycles of washing machine appliance 100.

According to exemplary embodiments, motor assembly 150 may generally include one or more of a drive motor 152, a transmission assembly 154, and/or a clutch assembly for engaging and disengaging wash basket 112 and/or agitation element 140. According to the illustrated embodiment, drive motor 152 is a brushless DC electric motor, e.g., a pancake motor. However, according to alternative embodiments, drive motor 152 may be any other suitable type or configuration of motor. For example, drive motor 152 may be an AC motor, an induction motor, a permanent magnet synchronous motor, or any other suitable type of motor.

Cabinet 102 of washing machine appliance 100 has a top panel 160. Top panel 160 defines an opening (FIG. 2) that coincides with opening 116 of wash basket 112 to permit a user access to wash basket 112. Washing machine appliance 100 further includes a door 162 which is rotatably mounted to top panel 160 to permit selective access to opening 116. In particular, door 162 selectively rotates between the closed position (as shown in FIGS. 1 and 3) and the open position (as shown in FIG. 2). In the closed position, door 162 inhibits access to wash basket 112. Conversely, in the open position, a user can access wash basket 112. A window 164 in door 162 permits viewing of wash basket 112 when door 162 is in the closed position, e.g., during operation of washing machine appliance 100. Door 162 also includes a handle 166 that, e.g., a user may pull and/or lift when opening and closing door 162. Further, although door 162 is illustrated as mounted to top panel 160, door 162 may alternatively be mounted to cabinet 102 or any other suitable support.

A control panel 170 with at least one input selector 172 (FIG. 1) extends from top panel 160. Control panel 170 and input selector 172 collectively form a user interface input for operator selection of machine cycles and features. A display 174 of control panel 170 indicates selected features, operation mode, a countdown timer, and/or other items of interest to appliance users regarding operation.

Operation of washing machine appliance 100 is controlled by a controller or processing device 178 (FIGS. 1 and 4) that is operatively coupled to control panel 170 for user manipulation to select washing machine cycles and features. In response to user manipulation of control panel 170, controller 178 operates the various components of washing machine appliance 100 to execute selected machine cycles and features. As described in more detail below with respect to FIG. 4, controller 178 may include a memory and microprocessor, such as a general or special purpose microprocessor operable to execute programming instructions or micro-control code associated with methods described herein. Alternatively, controller 178 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 170 and other components of washing machine appliance 100 may be in communication with controller 178 via one or more signal lines or shared communication busses.

Figure 4:
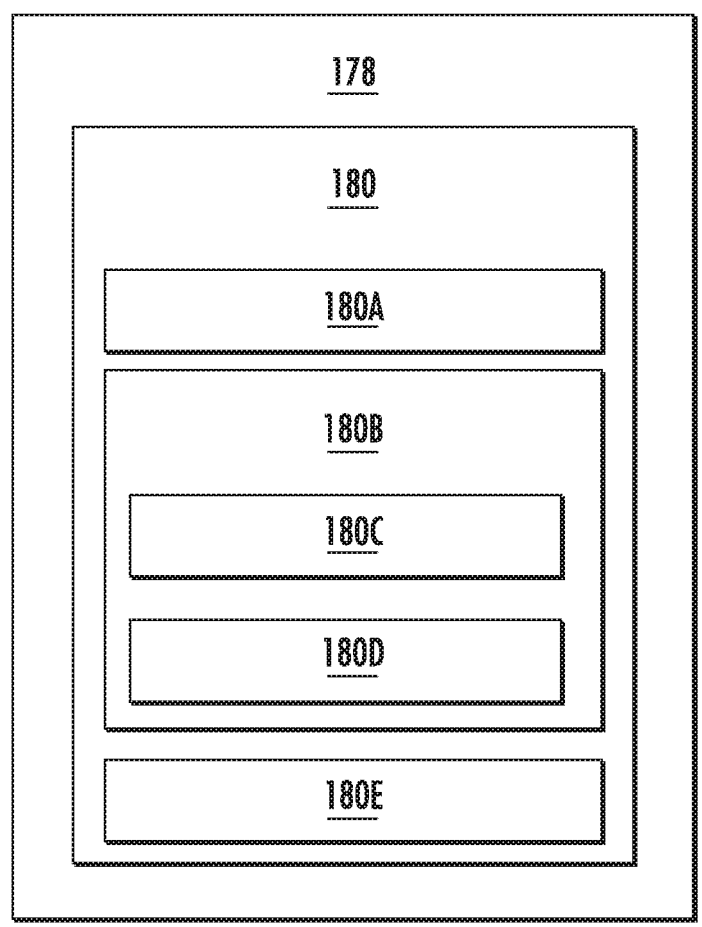
FIG. 4 depicts certain components of a controller according to example embodiments of the present subject matter.

FIG. 4 depicts certain components of controller 178 according to example embodiments of the present disclosure. Controller 178 can include one or more computing device(s) 180 which may be used to implement methods as described herein. Computing device(s) 180 can include one or more processor(s) 180A and one or more memory device(s) 180B. The one or more processor(s) 180A can include any suitable processing device, such as a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs) (e.g., dedicated to efficiently rendering images), processing units performing other specialized calculations, etc. The memory device(s) 180B can include one or more non-transitory computer-readable storage medium(s), such as RAM, ROM, EEPROM, EPROM, flash memory devices, magnetic disks, etc., and/or combinations thereof.

The memory device(s) 180B can include one or more computer-readable media and can store information accessible by the one or more processor(s) 180A, including instructions 180C that can be executed by the one or more processor(s) 180A. For instance, the memory device(s) 180B can store instructions 180C for running one or more software applications, displaying a user interface, receiving user input, processing user input, etc. In some implementations, the instructions 180C can be executed by the one or more processor(s) 180A to cause the one or more processor(s) 180A to perform operations, e.g., such as one or more portions of methods described herein. The instructions 180C can be software written in any suitable programming language or can be implemented in hardware. Additionally, and/or alternatively, the instructions 180C can be executed in logically and/or virtually separate threads on processor(s) 180A.

The one or more memory device(s) 180B can also store data 180D that can be retrieved, manipulated, created, or stored by the one or more processor(s) 180A. The data 180D can include, for instance, data to facilitate performance of methods described herein. The data 180D can be stored in one or more database(s). The one or more database(s) can be connected to controller 178 by a high bandwidth LAN or WAN, or can also be connected to controller through network(s) (not shown). The one or more database(s) can be split up so that they are located in multiple locales. In some implementations, the data 180D can be received from another device.

The computing device(s) 180 can also include a communication module or interface 180E used to communicate with one or more other component(s) of controller 178 or washing machine appliance 100 over the network(s). The communication interface 180E can include any suitable components for interfacing with one or more network(s), including for example, transmitters, receivers, ports, controllers, antennas, or other suitable components.

During operation of washing machine appliance 100, laundry items are loaded into wash basket 112 through opening 116, and washing operation is initiated through operator manipulation of input selectors 172. Wash basket 112 is filled with water and detergent and/or other fluid additives via primary dispenser 110. One or more valves can be controlled by washing machine appliance 100 to provide for filling wash tub 108 and wash basket 112 to the appropriate level for the amount of articles being washed and/or rinsed. By way of example for a wash mode, once wash basket 112 is properly filled with fluid, the contents of wash basket 112 can be agitated (e.g., with an impeller as discussed previously) for washing of laundry items in wash basket 112.

After the agitation phase of the wash cycle is completed, wash basket 112 can be drained, e.g., by drain pump assembly 132. Laundry articles can then be rinsed by again adding fluid to wash basket 112 depending on the specifics of the cleaning cycle selected by a user. The impeller or agitation element 140 may again provide agitation within wash basket 112. One or more spin cycles may also be used as part of the cleaning process. In particular, a spin cycle may be applied after the wash cycle and/or after the rinse cycle in order to wring wash fluid from the articles being washed. During a spin cycle, wash basket 112 is rotated at relatively high speeds to help wring fluid from the laundry articles through perforations 118. After articles disposed in wash basket 112 are cleaned and/or washed, the user can remove the articles from wash basket 112, e.g., by reaching into wash basket 112 through opening 116.

Notably, as explained briefly above, water entrainment within wash tub 108 can result in excessive drag on wash basket 112 which in turn can lead to reduced spin speeds, excessive motor heating, increased noise, and wearing of components. Specifically, the entrainment of wash fluid within annulus 124 and sump 130 can slow down the rotational speed of wash basket 112, e.g., due to the surface tension within the wash fluid. Aspects of the present subject matter are directed to determining when water entrainment is causing drag on wash basket 112 and methods for correcting the operation of washing machine appliance 100 when such drag occurs.

According to an exemplary embodiment, washing machine appliance includes a basket speed sensor 190 for detecting the speed of wash basket 112 in order to determine whether wash fluid is entrained within annulus 124 and/or sump 130. In this regard, basket speed sensor 190 may be any suitable sensor or sensors for monitoring the movement of wash basket 112 and determining a measured basket speed of wash basket 112. For example, according to the exemplary embodiments, basket speed sensor 190 is a Hall Effect sensor, an accelerometer, or an optical sensor. As explained below, the measured basket speed may be used to detect conditions where excessive drag slowing down wash basket 112 or generating additional stress on motor assembly 150.

According to another exemplary embodiment, washing machine appliance 100 need not have any sensors for obtaining the measured basket speed. In this regard, for example, controller 178 may be configured for determining the measured basket speed from the back electromotive force (EMF) of drive motor 152. It should be appreciated that other manners of determining the basket spin speed are possible and within the scope of the present subject matter. Although basket speed sensor 190 is described as measuring the rotational speed of wash basket 112, it could alternatively be used to measure the drive shaft rotational speed, the rotor speed, etc.

Now that the construction of washing machine appliance 100 and the configuration of controller 178 according to exemplary embodiments have been presented, an exemplary method 200 of operating a washing machine appliance will be described. Although the discussion below refers to the exemplary method 200 of operating washing machine appliance 100, one skilled in the art will appreciate that the exemplary method 200 is applicable to the operation of a variety of other washing machine appliances, such as horizontal axis washing machine appliances. In exemplary embodiments, the various method steps as disclosed herein may be performed by controller 178 or a separate, dedicated controller.

Figure 5:
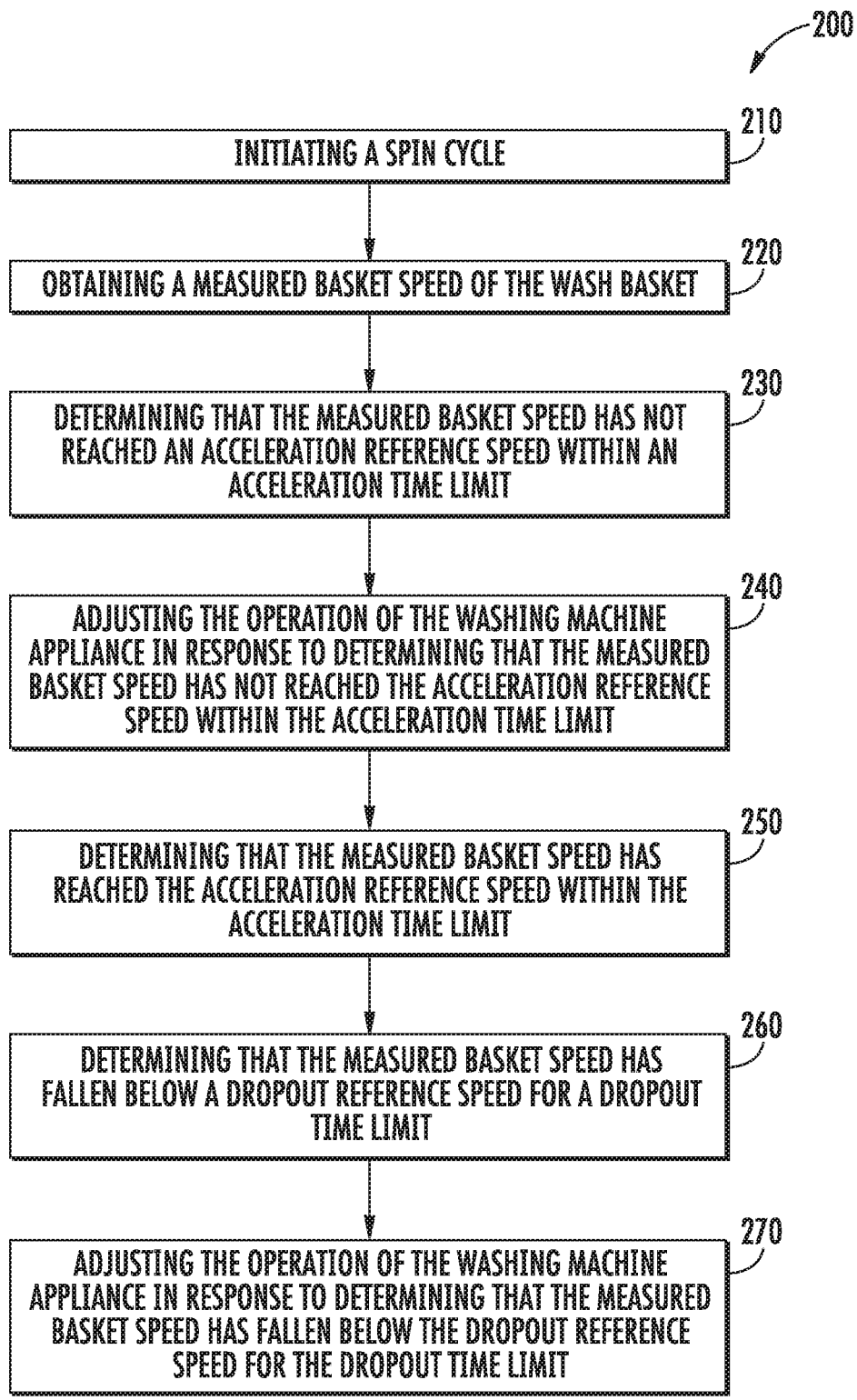
FIG. 5 illustrates a method for controlling a washing machine appliance in accordance with one embodiment of the present disclosure

Referring now to FIG. 5, method 200 includes, at step 210, initiating a spin cycle. In this regard, motor assembly 150 may begin rotating wash basket 112 with the goal of reaching a target spin speed for extracting water from articles within wash chamber 114. As explained briefly above, it may be desirable to monitor the speed of wash basket 112 in order to determine, for example, whether water entrainment is generating excessive drag on wash basket 112. Thus, in this regard, step 220 includes obtaining a measured basket speed of the wash basket. As explained above, the measured basket speed may be obtained using a suitable basket speed sensor 190, by measuring the back EMF of drive motor 152, or in any other suitable manner.

Method 200 may further include determining whether the measured basket speed reaches, exceeds, or falls below various specific operating speeds to determine whether corrective action should be taken to eliminate water or wash fluid within wash tub 108, or more specifically, within annulus 124 and/or sump 130. In this regard, controller 178 may be generally configured for determining that the measured basket speed has not crossed a predetermined basket speed within a predetermined time limit and adjusting the operation of the washing machine appliance in response to such a determination. According to exemplary embodiments, this may be achieved by starting a timer, e.g., at the start of the spin cycle, and monitoring whether the measured basket speed exceeds some threshold speed prior to the timer reaching a predetermined acceleration time limit. By contrast, if wash basket 112 is spinning at the target speed during a spin cycle, the timer may be started when the measured basket speed drops below a predetermined dropout reference speed. Thereafter, controller 178 may be configured for implementing corrective action if the measured basket speed does not increase above the dropout reference speed before the timer reaches a dropout time limit.

Specific methods of operation may be described herein using specific thresholds and time limits. However, it should be appreciated that the speed thresholds and time limits may vary as needed depending on the application while remaining within the scope of the present subject matter. For example, according to exemplary embodiments, the acceleration time limit and the dropout time limit are different, and may be greater than 20 seconds, about 30 seconds, or greater than a minute. It should be appreciated that as used herein, terms of approximation, such as "approximately," "substantially," or "about," refer to being within a ten percent margin of error.

According to exemplary embodiments, the acceleration reference speed and dropout reference speed may be fixed by the manufacturer or adjusted by a maintenance technician based on system operating parameters, common loading scenarios, motor condition, etc. For example, the acceleration reference speed and the dropout reference speeds may be set as a percentage of the target spin speed for a given spin cycle. Similarly, the acceleration time limit and the dropout time limit may be set as a percentage of the standard acceleration and recovery times based on a normal size or standard loading condition.

Referring again to method 200, step 230 includes determining that the measured basket speed has not reached an acceleration reference speed within an acceleration time limit. In this regard, for example, the acceleration reference speed may be 70 percent of the target speed and the acceleration time limit may be 30 seconds. Step 240 includes adjusting the operation of the washing machine appliance in response to determining that the measured basket speed has not reached the acceleration reference speed within the acceleration time limit. Notably, steps 230 and 240 are intended to provide an indication of when wash basket 112 does not ramp up to a target speed as quickly as desired, potentially indicating water entrainment, other issues causing excessive drag, motor issues, etc.

Method 200 may further include, at step 250, determining that the measured basket speed has reached the acceleration reference speed within the acceleration time limit. At step 260, method 200 includes determining that the measured basket speed has fallen below a dropout reference speed for a dropout time limit. In this regard, for example, the dropout reference speed may be, for example, 85 percent of the target speed and the dropout time limit may be 15 to 20 seconds.

Step 270 includes adjusting the operation of the washing machine appliance in response to determining that the measured basket speed has fallen below the dropout reference speed for the dropout time limit. Steps 250 through 270 are used to determine when wash basket 112 which was rotating at a target speed falls below the dropout reference speed and is not able to return to the target speed within a specific period of time. In this regard, these steps are used to determine whether motor assembly 150 is able to keep wash basket 112 within the desired speed range.

As used herein, references to operating parameter adjustments or "adjusting the operation of washing machine appliance" are intended to refer to control actions intended to correct basket speed issues detected during operation. In this regard, for example, adjusting the operation of washing machine appliance 100 may include regulating motor assembly 150 to reduce the measured basket speed. Doing so may allow water or wash fluid entrained within annulus 124 to fall into sump 130. After the water or wash fluid is drained, controller 178 may be configured for ramping back to normal operation, e.g., by accelerating wash basket 112 to the target speed after the measured basket speed has been reduced for a predetermined reduction period. In addition, or alternatively, adjusting the operation of the washing machine appliance may included operating drain pump assembly 132 to discharge wash fluid from wash tub 108.

Although the discussion herein refers to method 200 for operating washing machine appliance 100, one skilled in the art will appreciate that the features and configurations described may be used for operating other washing machine appliances in other manners. For example, method 200 may be used to operate a horizontal axis washing machine appliance, the predetermined speed thresholds and time limits may vary, and other means for measuring basket speed could be used. Other variations and modifications of the exemplary embodiment described below are possible, and such variations are contemplated as within the scope of the present subject matter.

FIG. 5 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using washing machine appliance 100 as an example, it should be appreciated that these methods may be applied to the operation of any suitable washing machine appliance.

Figure 6:
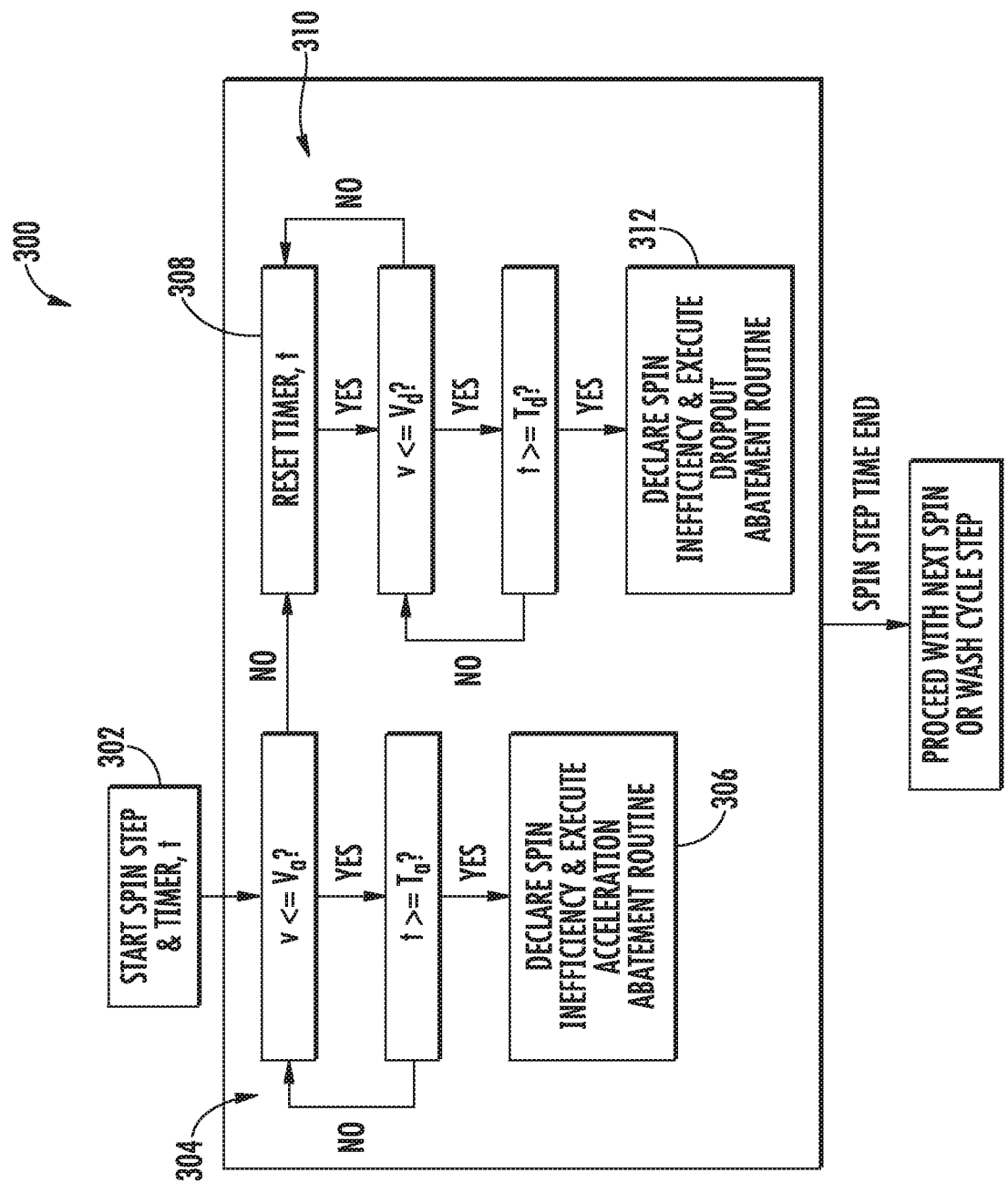
FIG. 6 illustrates an exemplary decision tree or flow diagram of an operating method of the washing machine appliance of FIG. 1 according to an exemplary embodiment of the present subject matter.

Referring now to FIG. 6, an exemplary illustration of the decision making process or control method implemented by controller 178 to perform method 200 is illustrated. It should be appreciated that the flow diagram 300 is intended only to provide a simple illustration of an exemplary control method. The flow diagram 300 is not intended to limit the scope of the present subject matter in any manner.

As illustrated, the washing machine controller may first initiate a spin cycle at 302, e.g., when the measured basket speed V is zero. The controller then implements an acceleration timer loop 304 as the motor assembly attempts to ramp the wash basket to the target speed. In this regard, the timer loop determines whether the measured basket speed V exceeds the acceleration reference speed $V_a$ before the timer reaches the acceleration time limit $T_a$. If the wash basket fails to speed up to the acceleration reference speed $V_a$ within the acceleration time limit Ta, the controller will take corrective action at step 306, e.g., as described above.

If the measured basket speed V does reach the acceleration reference speed $V_a$ within the acceleration time limit $T_a$, the controller will reset the timer at step 308. The controller then implements a dropout loop 310 which is generally designed to determine whether excessive drag is resulting in the wash basket speed not maintaining the target speed. In this regard, if the measured basket speed V drops below a dropout reference speed $V_d$ and if the measured basket speed V does not increase above the dropout reference speed $V_d$ before the dropout time limit $T_d$ is reached, the controller will once again take corrective action at step 312, e.g., as described above. As shown, when the measured basket speed V reaches or exceeds the dropout reference speed $V_d$, the timer is reset at 308. Although step 308 illustrates a timer being reset every time the measured basket speed V reaches or exceeds the dropout reference speed $V_d$, it should be appreciated that according to alternative embodiments, the controller may simply monitor the measured basket speed V and trigger a timer after the dropout reference speed $V_d$ is crossed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance comprising:
   a cabinet;
   a wash tub positioned within the cabinet and defining a wash chamber for receipt of articles for washing;
   a wash basket rotatably mounted within the wash tub;
   a motor operably coupled to the wash basket for selectively rotating the wash basket; and
   a controller operably coupled to the motor, the controller being configured to:
   initiating a spin cycle;
   obtaining a measured basket speed;
   determining that the measured basket speed has not reached an acceleration reference speed within an acceleration time limit measured from the initiation of the spin cycle when the wash basket is stationary; and
   adjusting the operation of the washing machine appliance in response to determining that the measured basket speed has not reached the acceleration reference speed within the acceleration time limit.

2. The washing machine appliance of claim 1, wherein the controller is further configured for:
   determining that the measured basket speed has reached the acceleration reference speed;
   determining that the measured basket speed has fallen below a dropout reference speed for a dropout time limit; and
   adjusting the operation of the washing machine appliance in response to determining that the measured basket speed has fallen below the dropout reference speed for the dropout time limit.

3. The washing machine appliance of claim 1, wherein adjusting the operation of the washing machine appliance comprises:
   regulating the motor to reduce the measured basket speed.

4. The washing machine appliance of claim 3, wherein adjusting the operation of the washing machine appliance further comprises:
   accelerating the wash basket to a target speed after the measured basket speed has been reduced for a predetermined reduction period.

5. The washing machine appliance of claim 1, wherein adjusting the operation of the washing machine appliance further comprises:

operating a drain pump to discharge wash fluid from the wash tub.

6. The washing machine appliance of claim 1, comprising:
a basket speed sensor for detecting the measured basket speed of the wash basket.

7. The washing machine appliance of claim 6, wherein the basket speed sensor is a Hall Effect sensor, an accelerometer, or an optical sensor.

8. The washing machine appliance of claim 1, wherein the controller is configured for determining the measured basket speed from the back electromotive force (EMF) of the motor.

9. The washing machine appliance of claim 2, wherein the acceleration time limit and the dropout time limit are different.

10. The washing machine appliance of claim 1, wherein the acceleration time limit and the dropout time limit are greater than 20 seconds.

11. A method for operating a washing machine appliance, the washing machine comprising a wash basket rotatably mounted within a wash tub and a motor for selectively rotating the wash basket, the method comprising:
initiating a spin cycle;
obtaining a measured basket speed of the wash basket;
determining that the measured basket speed has not reached an acceleration reference speed within an acceleration time limit measured from the initiation of the spin cycle when the wash basket is stationary; and
adjusting the operation of the washing machine appliance in response to determining that the measured basket speed has not reached the acceleration reference speed within the acceleration time limit.

12. The method of claim 11, further comprising:
determining that the measured basket speed has reached the acceleration reference speed;
determining that the measured basket speed has fallen below a dropout reference speed for a dropout time limit; and
adjusting the operation of the washing machine appliance in response to determining that the measured basket speed has fallen below the dropout reference speed for the dropout time limit.

13. The method of claim 11, wherein adjusting the operation of the washing machine appliance comprises:
regulating the motor to reduce the measured basket speed.

14. The method of claim 13, wherein adjusting the operation of the washing machine appliance further comprises:
accelerating the wash basket to a target speed after the measured basket speed has been reduced for a predetermined reduction period.

15. The method of claim 11, wherein adjusting the operation of the washing machine appliance further comprises:
operating a drain pump to discharge wash fluid from the wash tub.

16. The method of claim 11, wherein the measured basket speed is obtained using a basket speed sensor.

17. The method of claim 11, comprising:
determining the measured basket speed from the back electromotive force (EMF) of the motor.

18. A washing machine appliance comprising:
a cabinet;
a wash tub positioned within the cabinet and defining a wash chamber for receipt of articles for washing;
a wash basket rotatably mounted within the wash tub;
a motor operably coupled to the wash basket for selectively rotating the wash basket; and
a controller operably coupled to the motor, the controller being configured to:
initiating a spin cycle;
obtaining a measured basket speed;
determining that the measured basket speed has not crossed a predetermined basket speed within a predetermined time limit measured from the initiation of the spin cycle when the wash basket is stationary; and
adjusting the operation of the washing machine appliance in response to determining that the measured basket speed has not crossed the predetermined basket speed within the predetermined time limit.

19. The washing machine appliance of claim 18, wherein the predetermined basket speed is an acceleration reference speed and the predetermined time limit is an acceleration time limit.

20. The washing machine appliance of claim 18, wherein the predetermined basket speed is a dropout reference speed and the predetermined time limit is a dropout time limit.

* * * * *